(12) United States Patent
Bahl et al.

(10) Patent No.: US 7,076,054 B2
(45) Date of Patent: Jul. 11, 2006

(54) OUTPUT CURRENT AND VOLTAGE REGULATING INTERFACE FOR REMOTE TERMINAL

(75) Inventors: Erik Stefan Bahl, Huntsville, AL (US); John S. McGary, Petersburg, TN (US); Scott L. Smith, Madison, AL (US)

(73) Assignee: Adtran Inc., Huntsville, AL (US)

( * ) Notice: Subject to any disclaimer, the term of this patent is extended or adjusted under 35 U.S.C. 154(b) by 922 days.

(21) Appl. No.: 10/113,103

(22) Filed: Apr. 1, 2002

(65) Prior Publication Data

US 2003/0185384 A1 Oct. 2, 2003

(51) Int. Cl.
*H04M 1/00* (2006.01)

(52) U.S. Cl. .................... 379/399.01; 379/413
(58) Field of Classification Search ........... 379/399.01, 379/413
See application file for complete search history.

(56) References Cited

U.S. PATENT DOCUMENTS

2002/0126833 A1* 9/2002 Youngblood ........... 379/399.01

* cited by examiner

*Primary Examiner*—Jefferey F. Harold
(74) *Attorney, Agent, or Firm*—Allen, Dyer, Doppelt, Milbrath & Gilchrist, P.A.

(57) ABSTRACT

A regulated power supply interface has a current feedback and voltage level shift circuit that monitors power supply output (load) current and controllably diverts current to a current reference node. A differential amplifier-based, voltage feedback and voltage level shift circuit monitors the load voltage and controllably diverts output current to the current reference node. A current mode setpoint circuit has multiple voltage dropping current paths, through one or more of which a summation of the diverted load currents are programmably directed, to generate a control voltage for controlling the operation of a pulse width modulator unit of the regulated power supply.

24 Claims, 4 Drawing Sheets

OUTPUT CURRENT AND VOLTAGE REGULATING INTERFACE FOR REMOTE TERMINAL

FIELD OF THE INVENTION

The present invention relates in general to power supply systems and subsystems therefor, and is particularly directed to a regulated power supply interface that provides current and voltage regulation in the presence of changing conditions of load and installation ambient temperature, making the regulation interface particularly useful in a remote telecommunications terminal supplying power to a device such as, but not limited to a coin-operated telephone, in which load (impedance) parameters vary during the course of changes in operational conditions of the device.

BACKGROUND OF THE INVENTION

The ability of regulated power supplies and interfaces therefor to maintain their intended performance over changing operational and environmental conditions is a critical aspect to the successful deployment and operation of a variety of electronic systems and components thereof. Within the telecommunication industry, for example, the load and powering requirements of a number of equipments, such as but not limited to coin-operated telephones, can be expected to change substantially over the course of the establishment of a call, during normal voice operation, and at the termination of a call.

With the continued expansion of digital subscriber line (DSL) communication infrastructures having remote terminal facilities located proximate a customer's facility and well beyond central office-based legacy networks, regulated power supplies used for such devices can also be impacted by changes in the environment in which they are installed, in addition to having to accommodate changes in voltage and current criteria associated with the (digitally programmable) operation of the device. In comparison to a traditional central office installation, ambient conditions (such as temperature) within a remote terminal can be relatively austere or extreme, and may negatively impact the performance of equipments that had historically performed satisfactorily in a traditional central office.

SUMMARY OF THE INVENTION

Pursuant to the invention these issues are successfully addressed by a new and improved regulated power supply interface, that is operative to adjust the control voltage for a pulse width modulation (PWM) unit of a regulated power supply of the type that may be installed in a remote terminal, and the current source output stage of which is coupled to drive a load such as, but not limited to a coin-operated telephone, with impedance characteristics of which are subject to substantial variation. The interface includes a current feedback and voltage level shift circuit coupled in series between the supply output and the load, and a differential amplifier-based voltage feedback and voltage level shift circuit coupled across the power supply's output line feeding the load.

Current-feeding outputs from the current feedback and voltage level shift circuit and the voltage feedback and voltage level shift circuit are coupled to a current mode setpoint circuit. These circuits are used to adjust the control voltage for the PWN unit by controllably diverting currents from the power supply output line, in accordance with monitored current and voltage parameters associated with characteristics of the load. The current feedback and voltage level shift circuit controllably causes the PWM unit of the power supply to control the drive current to the power supply's current source output stage, so that the power supply output will satisfy regulation parameters for an overcurrent condition, as may be associated with a very small load impedance, such as a dead short across the output line; similarly, the voltage feedback and voltage level shift circuit controllably causes the PWM unit of the power supply to control the drive current to the power supply's current source output stage, so that the power supply output will satisfy regulation parameters for an excessive impedance condition, as in the case of an open circuit. Between these two extremes there is a 'crossover' condition, where the regulation functionality transfers from current-to-voltage, and voltage-to-current, as the load impedance changes.

In a non-limiting, but preferred implementation, the current mode setpoint circuit is configured as a programmable, multi-path, current distribution circuit, having a summing input node coupled to receive a current $I_{REF}$ as a composite of a current component supplied by the current feedback and voltage level shift circuit, and a current component supplied by the voltage feedback and voltage level shift circuit. This summing input node couples a control voltage to the error amplifier input port of the PWM unit, which regulates the output current/voltage of the power supply's output stage.

The current paths through the current distribution circuit contain voltage-dropping resistors and control elements (transistors). One or more of the control elements may be programmed to control the distribution of the input current $I_{REF}$ through the current distribution paths in association with a voltage select input supplied to the voltage feedback and voltage level shift circuit, so that the PWM unit will control the power supply output so as to maintain the value of control voltage at a prescribed value.

The current feedback and voltage level shift circuit contains a load current sense resistor installed in a current flow output path between the power supply output stage and the load. A by-pass or feedback current device, such as a transistor, is coupled between the output of the power supply output stage and the current mode setpoint circuit. As long as the magnitude of the current drawn by the load is relatively small, the voltage across the sense resistor will be small and insufficient to turn on the feedback transistor. However, upon the load current increasing to the point that the voltage across the sense resistor forward biases the current feedback transistor, that transistor will divert power supply output current to the current mode setpoint circuit. Once the voltage drop across the sense resistor attains a value where the magnitude of the bypass current is equal to the maximum value of $I_{REF}$ (at which the control voltage to the PWM unit is at its target value), the self-regulation operation of the PWM unit will continue to control the drive to the power supply output stage as necessary to maintain the power supply output current at a value that satisfies regulation parameters.

In order to make it effectively immune to variations in the threshold characteristic of a passive voltage reference element associated with changes in ambient conditions, such as temperature, the voltage feedback and voltage level shift circuit comprises a differential amplifier circuit having a relatively large gain with one input coupled to a precision active voltage reference. The inverting output port of the differential amplifier is coupled to the base of a further current feedback transistor. The drive to this leg of the differential amplifier is derived from a programmable voltage divider coupled across the load. A voltage level select control input defining the composition of the divider is used in conjunction with the current level select input for the programmable current distribution circuit of the current mode setpoint circuit described above, so that voltage regulation is set in association with current regulation.

Similar to the current feedback and voltage level shift circuit, the current feedback transistor of the voltage feedback and voltage level shift circuit controllably provides a current feedback path for power is supply output current to the current mode setpoint circuit, but in accordance with variations in the load voltage as determined by the differential amplifier. For relatively small values of load voltage associated with relatively small load impedance, the differential amplifier's output voltage will maintain its associated feedback transistor turned off. When the load impedance increases to the point where the output voltage is very large, however, the inverting output of the differential amplifier will turn on the feedback transistor, to divert current from the power supply output to the current mode setpoint circuit.

For increasingly larger values of load impedance and corresponding increased values of load voltage, the magnitude of the by-pass current will eventually become equal to the maximum value of $I_{REF}$. Once the load impedance reaches a value where the magnitude of the bypass current is equal to the maximum value of $I_{REF}$, then, for an further increase in load impedance, the self-regulation operation of the PWM unit will have increased control the drive to the power supply output stage to a value where the power supply output voltage effectively complies with (open circuit) regulation parameters.

DETAILED DESCRIPTION

Before detailing the regulated power supply interface of the present invention, it should be observed that the invention resides primarily in a new and improved circuit architecture that is configured to be interfaced with standard regulated power supply components, such as those of a pulse width modulated supply of the type used in telecommunication equipment powering applications. Consequently, such conventional power supply components have, for the most part, been depicted in readily understandable block diagram form in order to show only those specifics that are pertinent to the present invention, and not obscure the disclosure with details which will be readily apparent to those skilled in the art having the benefit of the description herein.

Figure 1:
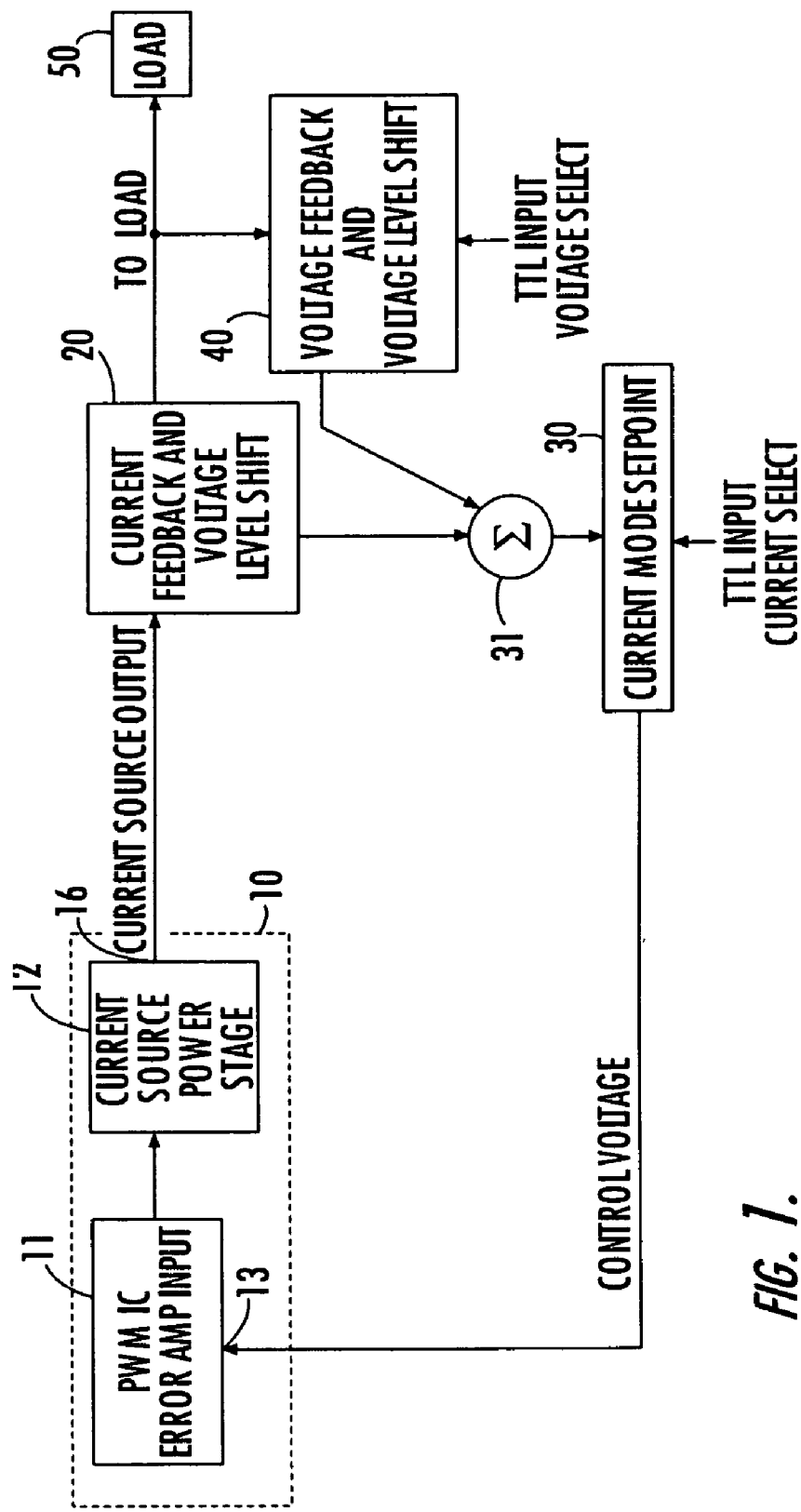
FIG. 1 is a reduced complexity diagram of the overall architecture of the regulated power supply interface of the present invention.

Attention is now directed to FIG. 1, which is a reduced complexity diagram of the overall architecture of the regulated power supply interface of the present invention, and the manner in which it interfaces a controllable power stage of conventional construction, such as a pulse width modulation (PWM) controllable power stage 10, as may be installed in a remote terminal, with a load such as a coin operated telephone served by the remote terminal, whose operational demands (and optionally environmental conditions) can be expected to vary. In FIG. 1 the controllable power supply 10 is shown as having a pulse width modulator (PWM) unit 11 that is operative to controllably regulate the output of the current source power stage 12 of the power supply, in accordance with a prescribed control voltage applied to a control port 13 of the PWM unit 11.

In accordance with the invention, the power supply's current source power stage 12 is coupled to drive a load 50 (for example, a coin-operated telephone), with impedance characteristics which are subject to substantial variation. In order to properly regulate the current and voltage parameters of the power supply output, a first, current feedback and voltage level shift circuit 20 (shown in detail in FIGS. 2 and 4, to be described) is coupled in series between the supply output and the load, while a second, voltage feedback and voltage level shift circuit 40 (shown in detail in FIGS. 2 and 5, to be described) is coupled across the power supply's output line feeding the load.

Figure 2:
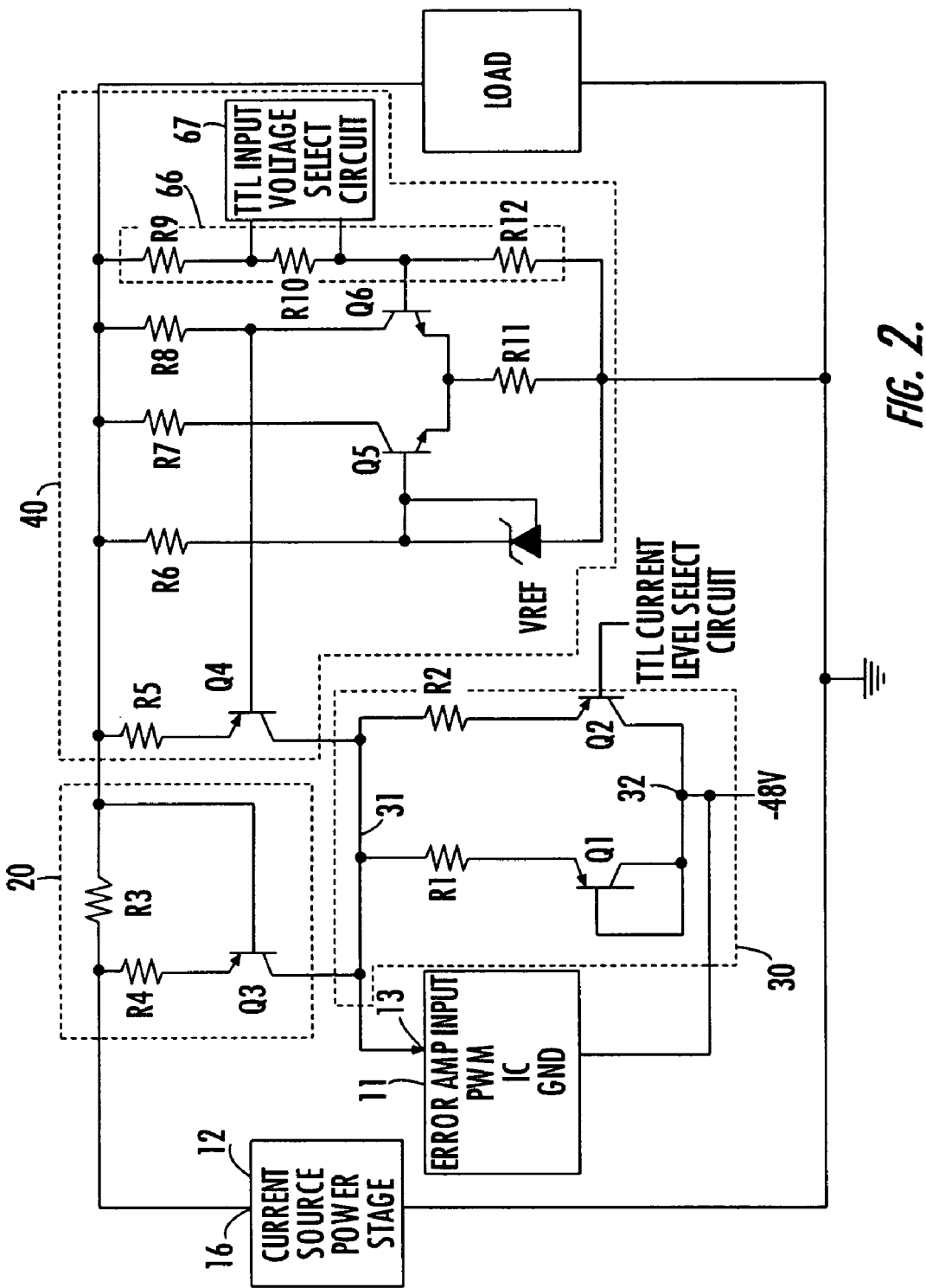
FIG. 2 shows a non-limiting circuit architecture for implementing and integrating the current mode set point, current regulation, and voltage regulation blocks of the regulation control and interface circuit of FIG. 1.
Figure 3:
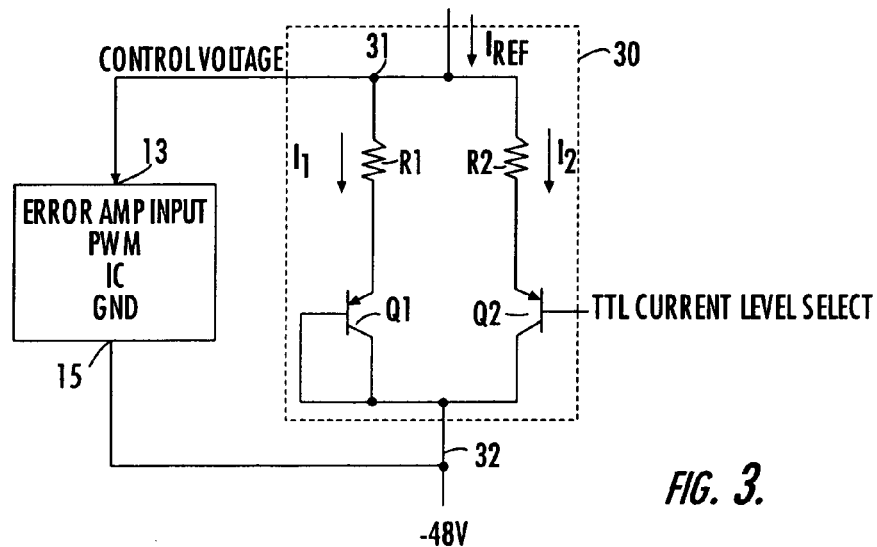
FIG. 3 shows the current mode setpoint circuit of the regulation control and interface circuit of FIG. 1.

Each of the current feedback and voltage level shift circuit 20 and the voltage feedback and voltage level shift circuit 40 is coupled to summing node 31 of a current mode setpoint circuit 30 (shown in detail in FIGS. 2 and 3 to be described). The current mode setpoint circuit 30 is operative to produce the control voltage input to the PWM unit 11, in accordance with currents that are controllably diverted from the power supply output line based upon current and voltage parameters of the power supply's output line, as monitored by the current feedback and voltage level shift circuit 20 and the voltage feedback and voltage level shift circuit 40.

The current feedback and voltage level shift circuit 20 is used to control the drive current to the power supply's current source output stage, so that the power supply output will satisfy regulation parameters for an overcurrent condition (e.g., associated with a very small load impedance, such as a dead short as an extreme case), while the voltage feedback and voltage level shift circuit 40 is used to control the drive current to the power supply's current source output stage, so that the power supply output will satisfy regulation parameters for an excessive impedance condition (e.g., associated with an open circuit, as an extreme case). Between these two extremes there is what is nominally referred to as a 'crossover' condition, where the regulation functionality transfers from current-to-voltage, or vice-versa, as the load impedance changes. It should be noted that there is a TTL input signal interfaced to the current mode setpoint circuit 30 and the voltage feedback and voltage level shift circuit 40 which enable the device to be digitally programmed. This signal is provided by, but not limited to a microprocessor.

FIG. 2 shows a non-limiting but preferred circuit architecture for implementing and integrating each of the above described current mode set point, current regulation, and voltage regulation blocks of the regulation control and interface circuit of FIG. 1. In FIG. 2, circuit elements which make up each block are surrounded by broken lines. In order to facilitate an understanding of the operation of each block and the manner in which their respective functionalities are interfaced with one another to realize the composite current and voltage regulation functionality of the invention, the respective circuit blocks of FIG. 2 are described in detail below with reference to individual FIGS. 3, 4 and 5.

The architecture of the current mode setpoint circuit 30 is schematically shown in FIG. 3 as comprising the summing node 31 to which an input current $I_{REF}$ is applied, and an output node 32 that is coupled to a reference node (the negative voltage terminal or −48V in the present example). The current $I_{REF}$ corresponds to a composite of a first current component $I_{REF\ C}$ (associated with a sufficiently low load impedance or sufficiently high current condition) that may be supplied by the current feedback and level shift circuit 20, and a second current component $I_{REF\ V}$ (associated with a very high load impedance or potentially high voltage condition) that may be supplied by the voltage feedback and level shift circuit 40.

The summing node 31 is coupled to the error amplifier input port 13 of the pulse width modulator (PWM) unit 11, a voltage reference port 15 of which is coupled to the same reference voltage terminal as the output node 32 (the negative voltage terminal (−48V) in the present example). The summed current output of summing node 31 generates and supplies to the PWM unit 11 a control voltage that is to be maintained at a prescribed value (e.g., 2.5 volts in the present example) in accordance with the programmed output parameters of the power supply, and which accommodates changes in the load conditions of the power supply's output. The PWM unit 11 regulates the output current/voltage of the power supply's output stage 12 by way of pulse width modulation using conventional self-regulating feedback to its control voltage input terminal, so as to maintain this control voltage at a fixed or constant value.

Between nodes 31 and 32 the current mode set circuit 30 contains a programmable current distribution circuit having a plurality of current distribution paths for currents I1 and I2, in which respective voltage-dropping resistors R1 and R2 are installed. For purposes of providing a reduced complexity example, two current distribution paths I1 and I2 are shown. It is to be observed, however, that more than two current distribution paths may be employed without loss in generality, and multiple paths may be individually programmable as desired. Also, although bipolar devices are shown in each path, it is to be understood that the invention is not limited thereto, but may be implemented using alternative equivalent components, such as field effect transistors (FETs), for example.

In first current distribution path I1, resistor R1 is coupled in series with the emitter-collector current flow path of a diode-connected bipolar transistor Q1, the base and collector of which are connected in common to (the negative terminal (−48V) coupled) node 32. In the second current distribution path I2, resistor R2 is coupled in series with the emitter-collector current flow path of a bipolar transistor Q2, the collector of which is connected to node 32, and the base of which is coupled to receive a (TTL) current level select input. The value of the current through each path I1/I2 is the value of the control voltage minus the emitter-to-base threshold voltage (VEB) of the bipolar transistor in that current path divided by its associated branch resistor (R1/R2).

The current level select input to the base of transistor Q2 is used to program the distribution of the input or reference current $I_{REF}$ being supplied to the input node 31, through one or more of the current distribution paths of the current mode set circuit 30, in association with the voltage select input supplied to the voltage feedback and level shift circuit 40, so that the PWM unit 11 will control the power supply output to maintain the value of control voltage at node 31 at its target value (e.g., 2.5 volts in the present example). For a first logical state of the current level select input to the base of transistor Q2 that is effective to maintain transistor Q2 turned off, all of the current $I_{REF}$ supplied to node 31 will flow through the first path I1; for a second logical state of the current level select input to the base of transistor Q2 that is effective to turn transistor Q2 on, the current $I_{REF}$ supplied to node 31 will be distributed through both current distribution paths I1 and I2. By programming the current level select input to turn transistor Q2 on, the control action of the interface will set a higher value of regulated output current. Conversely, programming the current level select input to keep transistor Q2 turned-off, reduces the regulated value of output current.

Figure 4:
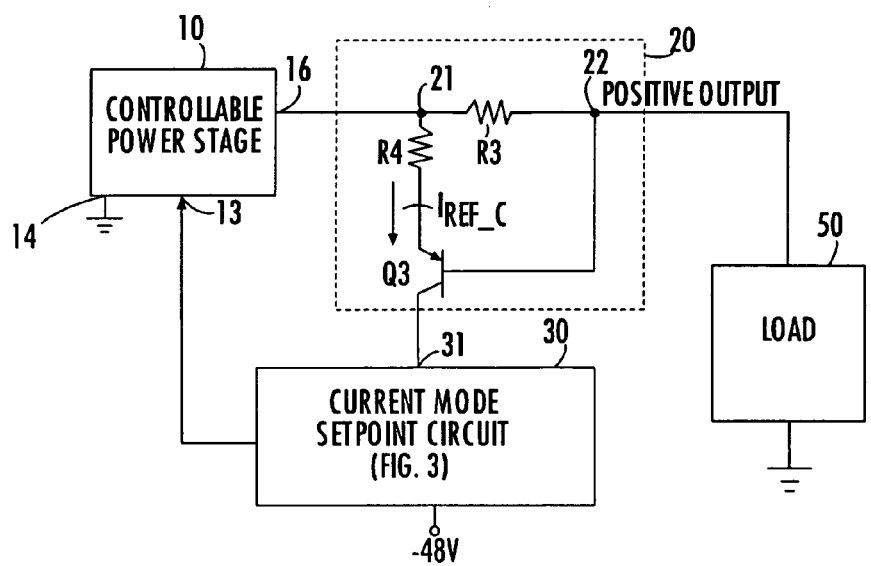
FIG. 4 shows the configuration of the current feedback and voltage level shift circuit of the regulation control and interface circuit of FIG. 1.

The circuit architecture of the current feedback and voltage level shift circuit 20 and the manner in which it interfaces with the current mode setpoint circuit of FIG. 3, is schematically shown in FIG. 4 as comprising a load current sense resistor R3, that is installed in a current flow output path between the current source power stage 12 and the load 50. As pointed out above, for the present example of coupling the negative (−) output port 14 of the power stage to ground (GND), the current sense resistor R3 is coupled between power supply (+) output port 16 and the load 50.

A first end 21 of the current sense resistor R3 that is coupled to the power stage Output port 16 is coupled through a resistor R4 to the emitter of a current feedback transistor Q3, the collector of which is coupled to the summing node 31 of current mode setpoint circuit 30. A second end 22 of the current sense resistor R3, to which the load 50 is coupled, is coupled to the base of feedback transistor Q3. As a result, current feedback transistor Q3 shifts the output voltage supplied by the power supply to the load to a reduced control voltage required by the PWM unit 11. With the base-emitter junction of feedback transistor Q3 being coupled (through resistor R4) across the sense resistor R3, transistor Q3 serves to controllably by-pass or feed-back a portion of the current being supplied by the controllable power stage 10, based upon the voltage drop across sense resistor R3, so as to cause the controllable power stage 10 to regulate the output current of the power supply.

More particularly, the voltage drop across the sense resistor R3 depends upon the magnitude of the output current being supplied by the current source power stage 12 to the load. As long as the magnitude of the current being drawn by the load is relatively small, the voltage across the current sense resistor R3 will also be relatively small and insufficient to forward bias feedback transistor Q3. However, as the output current increases to the point that the voltage across sense resistor R3 is sufficient to forward bias the current feedback transistor Q3, transistor Q3 begins to conduct, thereby diverting a portion of the power supply output current ($I_{REF\ C}$) through resistor R4 to the current summing node 31 of the current mode setpoint circuit 30.

As the load current continues to increase, the increased voltage drop across sense resistor R3 will eventually reach a value where the magnitude of $I_{REF\ C}$ through resistor R4 is equal to the maximum value of $I_{REF}$, namely that value of $I_{REF}$ for which the control voltage to the PWM unit 11 is at its target value (2.5V in the present example). Any further increase in load current will cause the current through resistor R4, and thus the current $I_{REF}$ at node 31 of the current mode setpoint circuit to increase, and potentially increase the value of the control voltage to the PWM unit 11 above its target value. Due to its self-regulation operation, however, the PWM unit 11 responds by controlling the drive to the current source power stage 12, so that the power supply output voltage will satisfy the regulation parameters of power supply's PWM unit 11.

Because the current feedback transistor Q3 shifts the current sense voltage level at the power supply's positive output terminal 16 to a relatively reduced voltage (e.g., 2.5V, in the present example), the voltage rating of transistor Q3 must be high enough to withstand the open circuit compliance voltage (which may be as large as 120 VDC, for example) plus the input line voltage (e.g., 48 VDC).

Figure 5:
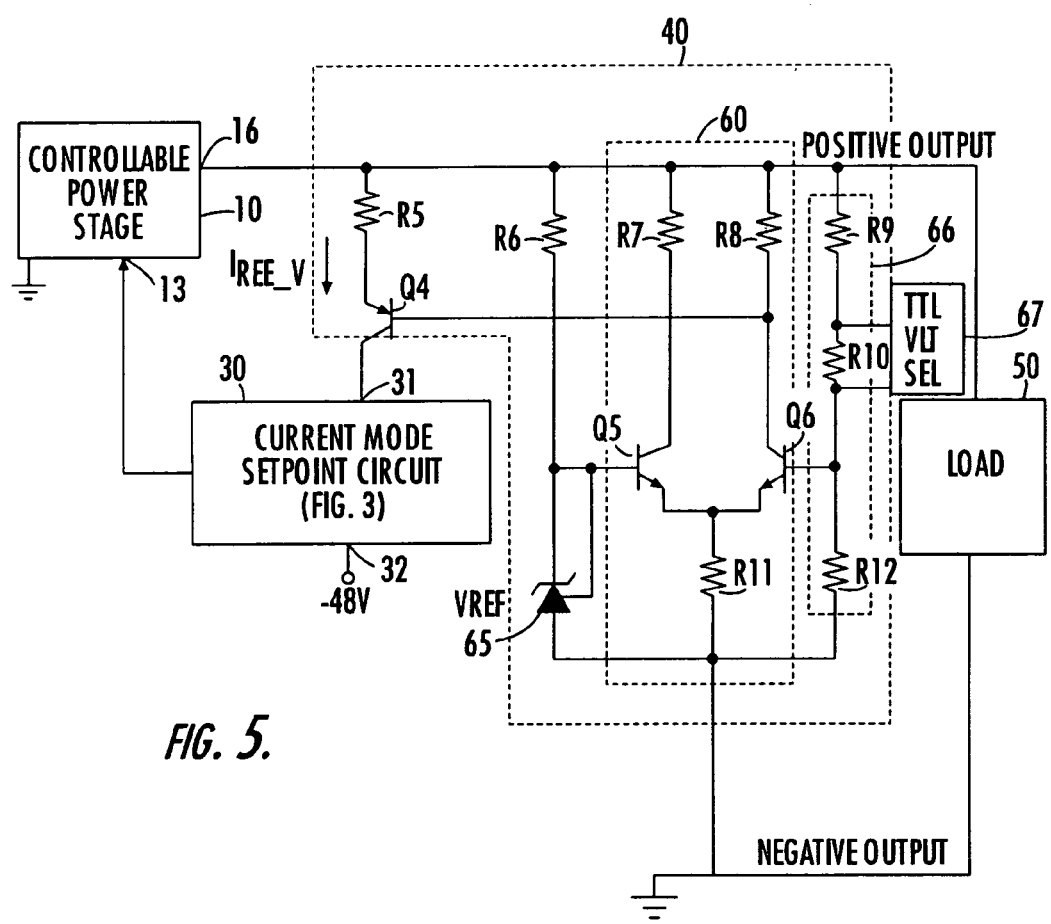
FIG. 5 shows the configuration of the voltage feedback and voltage level shift circuit of the regulation control and interface circuit of FIG. 1.

FIG. 5 shows the circuit architecture of the voltage feedback and voltage level shift circuit 40, and the manner in which it interfaces with the current mode setpoint circuit 30 of FIG. 3, as comprising a differential amplifier circuit 60, the voltage threshold parameters of which are programmable. As pointed out previously, the use of a differential mode circuit with one input coupled to a precision active voltage reference to sense variations in the output voltage across the load makes the circuit effectively immune to variations in the threshold characteristic of a passive voltage reference element (e.g., Zener diode) associated with changes in ambient conditions, such as temperature.

A first leg of the differential amplifier 60 includes a first transistor Q5 having its bass coupled through a resistor R6 to the nongrounded portion of the power supply's output 16 (the positive supply output in the present example), to which the load 50 is coupled. The base of transistor Q5 is further coupled to a precision active voltage reference device 65 (here a TL431A Zener diode), coupled to ground. The first transistor Q5 has its collector coupled through a collector bias resistor R7 to the power supply positive output line feeding the load, and its emitter coupled through an emitter bias resistor R11 to ground.

A second leg of the differential amplifier 60 includes a second transistor Q6, having its collector serving as an inverting output and coupled to the base of a further current feedback and voltage level shift transistor Q4. The collector of transistor Q6 is also coupled through a collector bias resistor R8 to the non-grounded portion of the power supply's output to which the load is coupled, and its emitter coupled through emitter-bias resistor R11 to ground. The base of the second transistor Q6 is coupled to a programmable voltage divider 66, that is coupled across the positive and negative output lines to which the load is coupled. The voltage gain of the differential amplifier 60 is sufficiently large, so that, during linear operation, the amplifier's input voltages applied to the bases of transistors Q5 and Q6 are equal (similar to an ideal operational amplifier).

The voltage divider 66 is comprised of a plurality of resistors (two of which are shown at R9 and R10) coupled between the positive supply line and the base of transistor Q6, and a resistor R12 coupled between the base of transistor Q6 and the negative supply line. The resistor R10 is shown as being bridged by a controllable shorting circuit 67, to which a control input from a TTL voltage level select circuit is supplied. This control input allows the voltage regulation parameters of the circuit to be programmable (by adjusting the composition of the voltage divider 66, namely whether resistor R10 is in or out of the circuit). This voltage level control input is used in conjunction with the (TTL) current level select input supplied to the base of transistor Q2 of the programmable current distribution circuit 30 of the current mode setpoint circuit of FIG. 3, described above, so that voltage regulation is set in association with current regulation.

In this regard, it should also be noted that, similar to the current mode setpoint circuit of FIG. 3, the input voltage of the base of transistor Q6, which is established in accordance with the parameters of the voltage divider 66, will equal the voltage of the precision voltage reference device 65, and the output voltage may have more than two programmable settings. As one non-limiting implementation, this may be accomplished by modifying the series resistor arrangement of the divider to include more than one selectively shortable resistor.

As noted above, the inverting output of the differential amplifier 60 at the collector of transistor Q6 is coupled to the base of a further current feedback transistor Q4. Similar to the current feedback transistor Q3 of the current feedback and voltage level shift circuit 20 of FIG. 4, the further current feedback transistor Q4 has its emitter effectively coupled through a resistor R5 and R3 to the current source power stage output port 16 and its collector to summing node 31 of current mode setpoint circuit 30. As such, current feedback transistor Q4 shifts the output voltage of the differential amplifier 60 relative to the power supply's positive output 16 to the reduced control voltage required by the PWM unit 11.

Like transistor Q3, the voltage rating of the transistor Q4 must be high enough to withstand the open circuit compliance voltage plus the input line voltage. Also, similar to transistor Q3, the current feedback transistor Q4 is operative to controllably provide a current flow path for power supply output current through the resistor R5 to summing node 31 of the current mode setpoint circuit, but in accordance with variations in the load voltage as determined by differential amplifier 60, as opposed to differences in output current as sensed by sense resistor R3.

More particularly, the voltage at the inverting output of the differential amplifier 60 (which is derived from the collector of transistor Q6) will correspond to the difference between the voltage reference applied to the base of transistor Q5 and the proportional fraction of the load voltage as supplied to the base of transistor Q6 by the voltage divider 66. For relatively small values of load voltage associated with a relatively small load impedance, the differential amplifier's output voltage will maintain transistor Q4 turned off.

However, as the load impedance increases to the point where the output voltage is very large, in the inverting output leg of the differential amplifier, the voltage across collector resistor R8 will increase above that across resistor R5 and the emitter-to-base junction voltage of transistor Q4, so that the transistor Q4 begins to conduct. This causes current ($I_{REF\ V}$) to flow from the power supply output 16 through by-pass resistor R5 to the input node 31 of the mode current mode setpoint circuit 30. For increasingly larger values of load impedance and corresponding increased values of load voltage, the magnitude of the current $IREF_V$ through resistor R5 and into node 31 will eventually become equal to the maximum value of $I_{REF}$ (at which the control voltage is at its target value (2.5V). Any further increase in load impedance will cause the current through resistor R5 and thus the current $I_{REF}$ at node 31 of the current mode setpoint circuit to increase, and thus start to increase the value of the control voltage to the PWM unit 11 above its target value (here 2.5V) As described above, due to its self-regulation operation, the PWM unit 11 responds by controlling the drive to the power supply output stage 12, so that the power supply's output voltage will keep the output voltage at a value as determined by programmable voltage divider 66.

As will be appreciated from the foregoing description, regulated power supply interface of the invention is operative to precisely adjust the control voltage for a regulated power supply installed in a variable ambient environment, and which drives a load whose impedance characteristics are subject to substantial variation. The combined current/voltage feedback and level shift circuitry controllably causes the PWM unit of the power supply to control the drive current to the power supply's current source output stage, so that the power supply output will satisfy regulation parameters for an overcurrent condition, while causing the PWM unit of the power supply to control the drive current to the power supply's current source output stage, so that the power supply output will satisfy regulation parameters for an excessive impedance condition.

While we have shown and described an embodiment in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. An interface for coupling a controllable power supply to a load comprising:
    a current mode setpoint circuit that is operative to generate a control voltage for controlling the operation of said controllable power supply in accordance with an input current supplied thereto;
    a current feedback and voltage level shift circuit adapted to be coupled in a current flow output path between an output of said controllable power supply and said load, and being operative to controllably divert power supply output current away from said current flow output path to said current mode setpoint circuit, based upon a prescribed relationship between said power supply output current and a predetermined output current characteristic, and to shift the level of the output voltage applied by said controllable power supply to said load to a reduced control voltage for controlling the operation of said controllable power supply; and
    a temperature-insensitive voltage feedback and voltage level shift circuit adapted to be coupled to said current flow output path feeding said load, and being operative to controllably divert power supply output current away from said output path to said current mode setpoint circuit, based upon a prescribed relationship between a voltage across said load and a predetermined load voltage characteristic, and to shift the level of the output voltage applied by said controllable power supply to said load to said reduced control voltage for controlling the operation of said controllable power supply.

2. The interface according to claim 1, wherein said output of said controllable power supply is a positive output thereof, and wherein a negative output thereof is grounded.

3. The interface according to claim 1, wherein said output of said regulated power supply is a negative output thereof, and wherein a positive output thereof is grounded.

4. The interface according to claim 1, wherein said current mode setpoint circuit comprises a programmable, multi-path, current distribution circuit, having a summing input node coupled to receive as said input current a composite of a first output current component as controllably diverted by said current feedback and level shift circuit, and a second output current component as controllably diverted by said voltage feedback and level shift circuit, said programmable, multi-path, current distribution circuit having multiple current paths containing voltage-dropping resistors through one or more of which said input Current is programmably distributed.

5. The interface according to claim 1, wherein said temperature-insensitive voltage feedback and level shift circuit includes a differential amplifier.

6. The interface according to claim 1, wherein said voltage feedback and voltage level shift circuit comprises a controlled feedback current device coupled between said current output path and said current mode setpoint circuit, said controlled feedback current device being operative to controllably divert power supply output current away from said current flow output path to said current mode setpoint circuit, in accordance with monitored voltage across said load.

7. The interface according to claim 1, wherein said current feedback and voltage level shift circuit comprises a current sense resistor installed in said current flow output path, and a controlled feedback current device coupled between said current output path and said current mode setpoint circuit, said controlled feedback current device being operative to controllably divert power supply output current away from said current flow output path to said current mode setpoint circuit, in accordance with monitored voltage across said current sense resistor.

8. The interface according to claim 7, wherein said voltage feedback and voltage level shift circuit comprises a controlled feedback current device coupled between said current output path and said current mode setpoint circuit, said controlled feedback current device being operative to controllably divert power supply output current away from said current flow output path to said current mode setpoint circuit, in accordance with monitored voltage across said load.

9. The interface according to claim 8, wherein said temperature-insensitive voltage feedback and voltage level shift circuit includes a differential amplifier having a first amplifier section coupled to a precision voltage reference device, and a second amplifier section coupled through a programmable voltage divider to said current output flow path feeding said load.

10. The interface according to claim 9, wherein said current mode setpoint circuit comprises a programmable, multi-path, current distribution circuit, having a summing input node coupled to receive as said input current a composite of a first output current component as controllably diverted by said current feedback and level shift circuit, and a second output current component as controllably diverted by said voltage feedback and level shift circuit, said programmable, multipath, current distribution circuit having multiple current paths containing voltage dropping resistors through one or more of which said input current is programmably distributed.

11. The interface according to claim 1, wherein said current feedback and voltage level shift circuit is operative to Cause said controllable power supply to regulate said output voltage in response to said power supply output current exceeding a predetermined overcurrent value, and wherein said temperature-insensitive voltage feedback and voltage level shift circuit is operative to cause said controllable power supply to regulate said output voltage in response to said voltage across said load exceeding a predetermined load voltage.

12. A method for coupling a controllable regulated power supply to a load comprising the steps of:

(a) monitoring a current flow output path between an output of said controllable regulated power supply and said load, and controllably diverting power supply output current away from said current flow output path to a current reference node, in accordance with a prescribed relationship between said power supply output current and a predetermined output current characteristic;

(b) monitoring a voltage across said load, and controllably diverting power supply output current away from said output path to said current reference node, in accordance with a prescribed relationship between a voltage across said load and a predetermined load voltage characteristic, and in a manner that is effectively insensitive to changes in ambient conditions of said controllable regulated power supply; and (c) generating a control voltage for controlling the operation of said controllable regulated power supply in accordance with current diverted to said current reference node in steps (a) and (b).

13. The method according to claim 12, wherein said output of said controllable regulated power supply is a positive output thereof, and wherein a negative output thereof is grounded.

14. The method according to claim 12, wherein said output of said controllable regulated power supply is a negative output thereof, and wherein a positive output thereof is grounded.

15. The method according to claim 12, wherein step (c) comprises generating said control voltage by selectively distributing said current diverted to said reference node in steps (a) and (b) among one or more paths of a programmable current distribution circuit having multiple current paths containing respective voltage dropping resistors therein.

16. The method according to claim 12, wherein step (b) comprises coupling a voltage across said load to a first amplifier notion of a differential amplifier, said differential amplifier having a second amplifier section coupled to a precision voltage reference device, and coupling an output of said differential amplifier to a controlled feedback current device coupled between said current output path and said current reference node, said controlled feedback current device being operative to controllably divert power supply output current away from said current flow output path to Said current reference node, in accordance with monitored voltage across said load.

17. The method according to claim 16, wherein step (b) comprises coupling said voltage across said load to said first amplifier section of said differential amplifier through a programmable voltage divider.

18. The method according to claim 12, wherein step (a) comprises coupling a controlled feedback current device between said current output path and said current reference node, and controlling the operation of said controlled feedback current device so as to controllably divert power supply output current away from said current flow output path to said current reference node, in accordance with said prescribed relationship between said power supply output current and said predetermined output current characteristic.

19. The method according to claim 12, wherein step (c) comprises generating said control voltage at a voltage value that is shifted relative to the output voltage supplied by said controllable regulated power supply to said load to a reduced value of control voltage, and controlling the operation of said controllable regulated power supply in accordance with said reduced value of control voltage.

20. The method according to claim 12, wherein step (a) further comprises causing said controllable regulated power supply to regulate output voltage thereof in response to said power supply output current exceeding a predetermined overcurrent value, and wherein step (b) further comprises causing said controllable regulated power supply to regulate said output voltage in response to said voltage across said load exceeding a predetermined load voltage.

21. An interface for coupling a controllable power supply having a positive output and a negative output, one of which is coupled to ground, to a load comprising:

a current feedback and voltage level shift circuit adapted to be coupled in a current flow output path between a non-grounded output of said regulated power supply and said load, and being operative to controllably divert power supply output current away from said current flow output path to a current reference node, in accordance with a prescribed relationship between said power supply output current and a predetermined output current characteristic, and to shift the level of the output voltage applied by said controllable power supply to said load to a reduced control voltage for controlling the operation of said controllable power supply;

a differential amplifierbased, voltage feedback and voltage level shift circuit adapted to be coupled to said current flow output path feeding said load, and being operative to controllably divert power supply output current away from said output path to said current reference node, in accordance with a prescribed relationship between a voltage across said load and a predetermined load voltage characteristic and to shift the level of the output voltage applied by said controllable power supply to said load to said reduced control voltage for controlling the operation of said controllable power supply; and a multi-path, current distribution circuit, having multiple current paths containing voltage dropping resistors, through one or more of which a summation of power supply output currents, as controllably diverted by said current feedback and voltage level shift circuit and said voltage feedback and voltage level shift circuit, are programmably directed, so as to provide said reduced control voltage for controlling the operation of said controllable power supply.

22. The interface according to claim 21, wherein said differential amplifierbased voltage feedback and voltage level shift circuit includes a differential amplifier having a first amplifier section coupled to a precision voltage reference device, and a second amplifier section coupled through a programmable voltage divider to said current output flow path feeding said load.

23. The interface according to claim 21, wherein said differential amplifier-based, voltage feedback and voltage level shift circuit comprises a controlled feedback current device coupled between said current output path and said current distribution circuit, said controlled feedback current device being operative to controllably divert power supply output current away from said current flow output path to said current distribution circuit, in accordance with monitored voltage across said load and wherein said feedback and voltage level shift circuit comprises a current sense resistor installed in said current flow output path, and a controlled feedback current device coupled between said current output path and said current distribution circuit, said controlled feedback current device being operative to controllably divert power supply output current away from said current flow output path to said current distribution circuit, in accordance with monitored voltage across said current sense resistor.

24. The interface according to claim 21, wherein said current feedback and voltage level shift circuit is operative to cause said controllable power supply to regulate said output voltage in response to said power supply output current exceeding a predetermined overcurrent value, and wherein said differential amplifier based voltage feedback and voltage level shift circuit is operative to cause controllable power supply to regulate said output voltage in response to said voltage across said load exceeding a predetermined load voltage.

* * * * *

UNITED STATES PATENT AND TRADEMARK OFFICE
CERTIFICATE OF CORRECTION

PATENT NO. : 7,076,054 B2
APPLICATION NO. : 10/113103
DATED : July 11, 2006
INVENTOR(S) : Bahl et al.

It is certified that error appears in the above-identified patent and that said Letters Patent is hereby corrected as shown below:

| | |
|---|---|
| Column 1, Line 66 | Delete: "voltage for the PWN unit"<br>Insert --voltage for the PWM unit-- |
| Column 3, Line 26 | Delete: "then, for an further"<br>Insert: --then, for any further-- |
| Column 3, Line 28 | Delete: "the PWM unit will have increased control"<br>Insert: --the PWM unit will control-- |
| Column 5, Line 58 | Delete: "threshold voltage (VEB) of the"<br>Insert: --threshold voltage ($V_{EB}$) of the-- |
| Column 6, Line 28 | Delete: "power stage Output port"<br>Insert: --power stage output port-- |
| Column 7, Line 25 | Delete: "to the nongrounded portion"<br>Insert: --to the non-grounded portion-- |
| Column 7, Line 32 | Delete: "through a collector"<br>Insert: --through a collector- -- |
| Column 7, Line 34 | Delete: "through an emitter"<br>Insert --through an emitter- -- |
| Column 8, Line 54 | Delete: "current $IREF_V$ through resistor"<br>Insert: --current $I_{REF\ v}$ through resistor-- |
| Column 8, Line 58 | Delete: "target value (2.5V)."<br>Insert: --target value (2.5V)).-- |
| Column 8, Line 63 | Delete: "2.5V) As described"<br>Insert: --2.5V). As described-- |

UNITED STATES PATENT AND TRADEMARK OFFICE
CERTIFICATE OF CORRECTION

PATENT NO. : 7,076,054 B2
APPLICATION NO. : 10/113103
DATED : July 11, 2006
INVENTOR(S) : Bahl et al.

It is certified that error appears in the above-identified patent and that said Letters Patent is hereby corrected as shown below:

Column 10, Line 4          Delete: "which said input Current is"
                           Insert: --which said input current is--

Signed and Sealed this

Fourteenth Day of November, 2006

JON W. DUDAS
*Director of the United States Patent and Trademark Office*